W. M. CAVANAUGH.
LEATHER FABRIC.
APPLICATION FILED MAY 6, 1912.
1,243,709.
Patented Oct. 23, 1917.
3 SHEETS—SHEET 1.
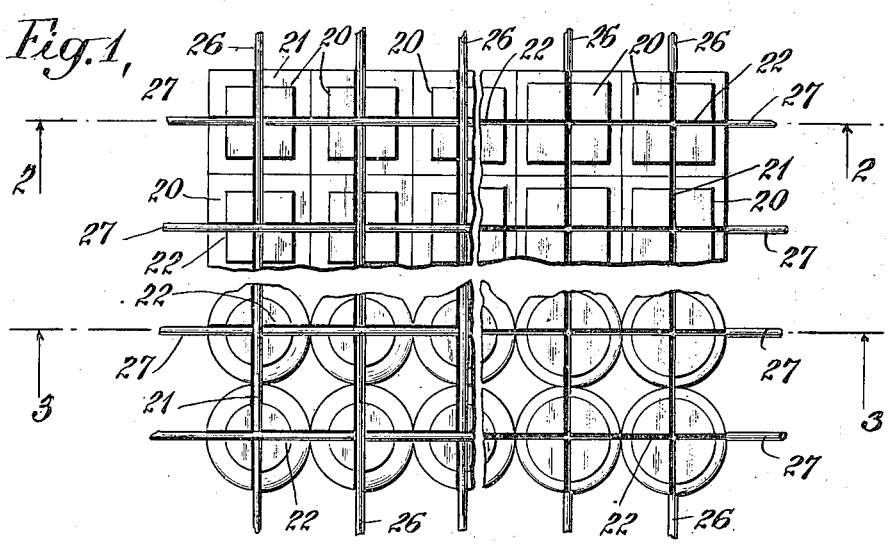
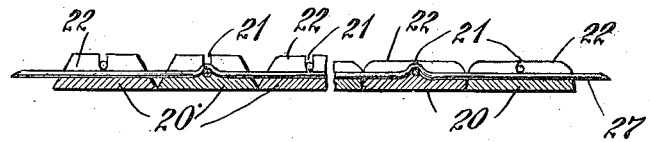
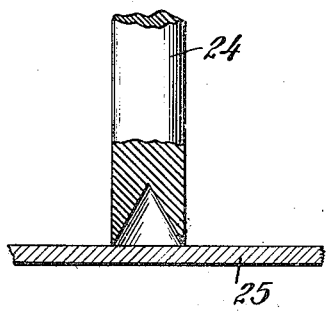
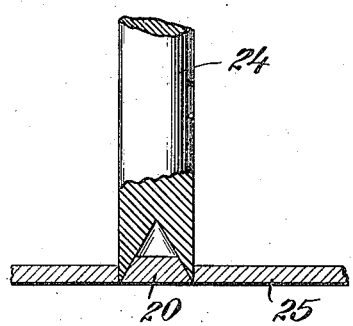
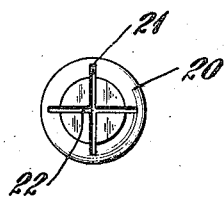
WITNESSES:
INVENTOR
William M. Cavanaugh
BY
Kenyon & Kenyon
ATTORNEYS W. M. CAVANAUGH.
LEATHER FABRIC.
APPLICATION FILED MAY 6, 1912.
1,243,709.
Patented Oct. 23, 1917.
3 SHEETS—SHEET 2.
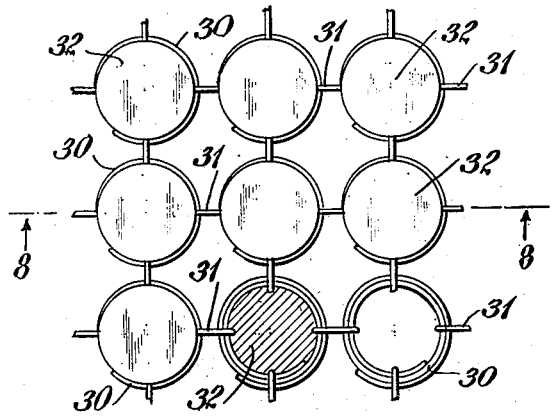
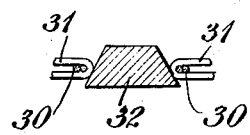
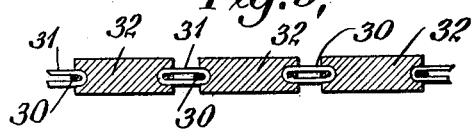
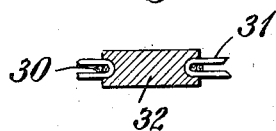
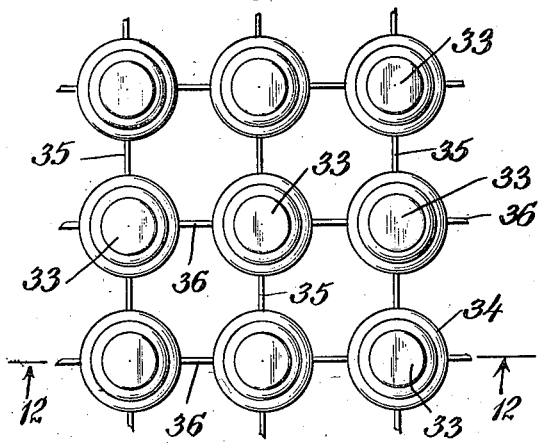
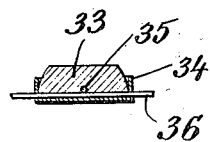
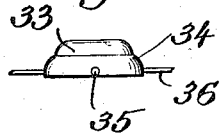
WITNESSES:
Jno. O. Gensler
Adam Schmidt
INVENTOR
William M. Cavanaugh
BY
Kenyon & Kenyon
ATTORNEYS

W. M. CAVANAUGH.
LEATHER FABRIC.
APPLICATION FILED MAY 6, 1912.

1,243,709.

Patented Oct. 23, 1917.
3 SHEETS—SHEET 3.

WITNESSES:
Jno. O. Templer
Adam Schmidt

INVENTOR
William M. Cavanaugh
BY
Kenyon & Kenyon
ATTORNEYS

UNITED STATES PATENT OFFICE.

WILLIAM M. CAVANAUGH, OF ROSEBANK, NEW YORK, ASSIGNOR, BY MESNE ASSIGNMENTS, TO LEATHER PRODUCTS COMPANY, INC., OF NEW YORK, N. Y., A CORPORATION OF NEW YORK.

LEATHER FABRIC.

1,243,709.  Specification of Letters Patent.  Patented Oct. 23, 1917.

Application filed May 6, 1912. Serial No. 695,461.

*To all whom it may concern:*

Be it known that I, WILLIAM M. CAVANAUGH, a citizen of the United States, and a resident of Rosebank, county of Richmond, and State of New York, have invented certain new and useful Improvements in Leather Fabric, of which the following is a specification.

My invention relates to an improved leather fabric. One object of my invention is to provide an improved fabric in which poor leather or separate pieces of leather may be utilized by reinforcement with wire or by combining such separate pieces together and reinforcing the same with wire to form a fabric suitable for use as belting, chair-seats, paneling, and many other purposes. Further objects, features, and advantages will more clearly appear from the detailed description given below taken in connection with the accompanying drawings which form a part of this specification.

In the drawings, Figure 1 is a plan view showing two forms of my improved fabric at different stages of its manufacture.

Fig. 2 is a section which may be considered as being taken both on the lines 2—2 and 3—3 of Fig. 1.

Fig. 3 illustrates one form of punch which may be used for punching the leather pieces used in the fabric shown in Fig. 1.

Fig. 4 is a similar view showing the operation of the punch.

Fig. 5 is a detailed section of one of the pieces of leather cut by the punch.

Fig. 6 is a plan view of one of the pieces of leather with grooves therein.

Fig. 7 is a plan view of a modified form of the fabric, some parts being omitted and in section, to more clearly illustrate the same.

Fig. 8 is a section taken on the line 8—8 of Fig. 7.

Fig. 9 is a detailed section illustrating the method of forming the fabric shown in Fig. 7.

Fig. 10 is a similar section showing the completion of one of the elements of the fabric. Fig. 11 is a plan view of a further modified form of the fabric. Fig. 12 is a section taken on the line 12—12 of Fig. 11. Fig. 13 is a section illustrating the method of forming the elements which go to make up the fabric shown in Fig. 11. Fig. 14 is a side view of one of the complete elements.

Figure 15:
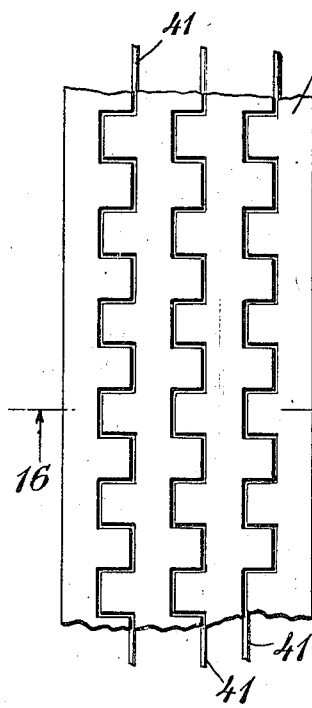
Figure 17:
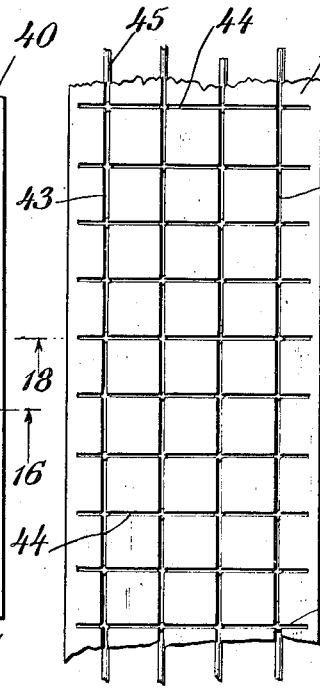
Figure 19:
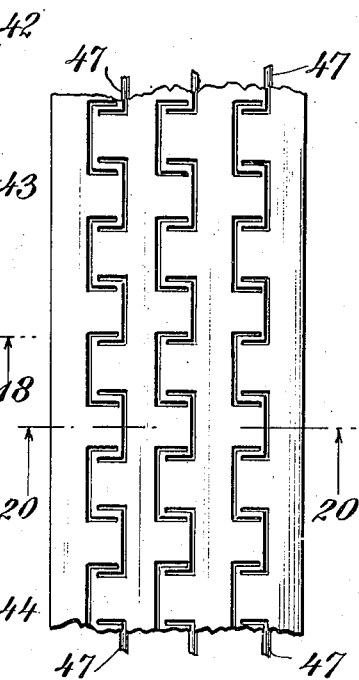
Figure 16:
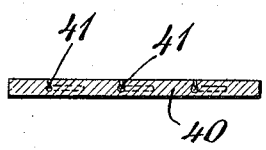
Figure 18:
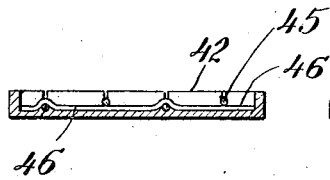
Figure 20:
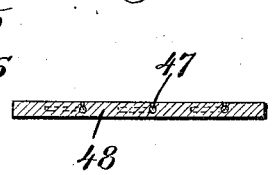

Figs. 15, 17 and 19 are plan views of still other modified forms, and Figs. 16, 18 and 20 are sections taken on the lines 16—16, 18—18 and 20—20 of Figs. 15, 17 and 19 respectively.

Referring to Figs. 1 to 6 inclusive, the fabric shown on the upper portion of Fig. 1 is composed of a plurality of square pieces of leather 20, having longitudinal grooves 21 and transverse grooves 22 therein. The pieces of leather 20 are preferably made by means of a punch, such as shown at 24 in Fig. 3, which punch may be operated upon a piece of leather 25 in a well-known manner, as shown in Fig. 4, in order to cut therefrom a piece of leather 20. It will be noticed that the punch is of such shape, and the leather being moistened or wetted, that the piece of leather 20 is distorted by the punching operation, so that it is of greater thickness and truncated in form, as shown in Fig. 5. The suitable grooves 21 and 22 are then formed in each piece of leather, and pieces of leather applied to wire netting composed of the longitudinal strand wires 26 and the transverse strand wires 27, and the wires embedded in grooves, as clearly shown in Fig. 1. The fabric then will have the appearance in section as shown in the left-hand half of Fig. 2. The fabric is then pressed by a suitable press so that the leather is forced down and about the wire, as shown in the right-hand half of Figs. 1 and 2, so that the wire netting becomes thoroughly embedded and gripped within the grooves of the leather pieces. The wire netting used is preferably made of small steel wire, but any suitable material may be used. The fabric shown on the lower half of Fig. 1 is exactly the same as that of the upper half, with the exception that the pieces of leather are round instead of square.

A fabric of this sort may be made of small pieces of leather which would otherwise go to waste, or of leather so poor in quality that it is unfit for most uses. The fabric made up in this manner may be used for belting for pulleys, etc., using the underneath side next to the pulley. The wiring, not only acts to hold together and in place the various pieces of leather, but to reinforce the whole structure, so that a flexible leather fabric is formed which is securely bound with wire embedded therein.

Referring to the modification shown in

Figs. 7 to 10 inclusive, the wiring is there shown of a different form and as made up of circular retaining members 30 connected together by wire links 31. Into the circular members 30 are inserted the pieces of leather 32, as shown in Fig. 9, which pieces of leather are like the pieces 20, above described, and made in the same manner. After the pieces of leather 32 are inserted, as shown in Fig. 9, the fabric is then pressed by a suitable press, so that the top portion of the pieces of leather is forced down and outwardly to firmly grip the circular retaining members, as clearly shown in Figs. 8 and 10. This forms a flexible fabric composed of small pieces of leather which are suitably held together and in place, which is cheaply made, and in which pieces of leather may be used which would otherwise have to be thrown away.

By the modification shown in Figs. 11 to 14 inclusive, similar pieces of leather 33 are placed in metallic cups 34, through the bottom of which extend longitudinally connecting wires 35 and transverse connecting wires 36 of a wire netting which holds the cup shaped members 34 in position with respect to one another. The wires 35 and 36 pass through small holes near the bottom of the metallic retaining members 34, and after the leather pieces are placed in the cup shaped members, the flanges thereof may be pressed inwardly, as shown in Figs. 12 and 14, in order to firmly grip the pieces 33.

Referring to the modification shown in Figs. 15 and 16, I there utilize a large piece of leather, but which because of poor quality, or of some defect therein, is not otherwise usable. To make use of such a piece of leather 40, I embed therein reinforcing wires 41 by first pressing corresponding grooves in one face of the leather and then forcing the wires into the grooves and pressing the leather together while wet in order to force or cover up the wires in the grooves. In these figures the wires are shown to extend in different directions, in order that a lateral, as well as a longitudinal reinforcement, may be had. Figs. 17 and 18 illustrate another similar modification, in which the piece of leather 42 is provided with longitudinal groves 43 and transverse grooves 44, into which are embedded longitudinal strand wires 45 and transverse strand wires 46 of the wire netting. As before, after the wire netting has been embedded in the face of the leather, the leather is pressed, in order that the material of the leather may be made to firmly grip the wire netting and lock it thereon. Figs. 19 and 20 illustrate the further modification in which reinforcing wire 47 consists of short pieces bent into U-shape and embedded in the leather 48 as before.

Although I have described my improvements in great detail, nevertheless I do not desire to be limited to these details except as clearly specified in the appended claims, since many changes and modifications may well be made without departing from the spirit and scope of my invention in its broader aspects. Having fully and clearly described my improvements, what I claim as new and desire to secure by Letters Patent is:

1. A fabric composed of wire netting with longitudinal and transverse strand wires and pieces of leather provided with grooves corresponding to said wires and into which grooves said wires are embedded.

2. The combination of metallic retaining members into which are pressed pieces of leather and wire connecting said members to form a flexible fabric.

3. The combination of circular metallic retaining members into which are pressed pieces of leather and links connecting said members to form a flexible fabric.

4. A flexible fabric composed of leather reinforced with wire embedded in grooves therein, said reinforcing wire extending in different directions in the leather.

In testimony whereof, I have signed my name to this specification, in the presence of two subscribing witnesses.

WILLIAM M. CAVANAUGH.

Witnesses:
 GORHAM CROSBY,
 EDWIN SEGER.